United States Patent
Hsu

(10) Patent No.: US 10,055,218 B2
(45) Date of Patent: Aug. 21, 2018

(54) SYSTEM AND METHOD FOR ADDING AND STORING GROUPS OF FIRMWARE DEFAULT SETTINGS

(71) Applicant: Quanta Computer Inc., Taoyuan (TW)

(72) Inventor: Chin-Huai Hsu, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 99 days.

(21) Appl. No.: 14/823,216

(22) Filed: Aug. 11, 2015

(65) Prior Publication Data
US 2017/0046151 A1 Feb. 16, 2017

(51) Int. Cl.
*G06F 9/44* (2018.01)
*G06F 8/654* (2018.01)
*G06F 9/445* (2018.01)

(52) U.S. Cl.
CPC .......... *G06F 8/654* (2018.02); *G06F 9/44505* (2013.01)

(58) Field of Classification Search
None
See application file for complete search history.

(56) References Cited

U.S. PATENT DOCUMENTS

| 2007/0027981 A1* | 2/2007 | Coglitore | H04L 43/0817 709/224 |
| 2009/0094401 A1* | 4/2009 | Larson | H04L 45/00 710/316 |
| 2012/0284494 A1* | 11/2012 | Funk | G06F 9/4408 713/2 |

FOREIGN PATENT DOCUMENTS

| TW | 201239759 A | 10/2012 |
| TW | 201310232 A | 3/2013 |
| TW | 201328248 A | 7/2013 |
| TW | 200907804 A | 2/2016 |

* cited by examiner

*Primary Examiner* — Qamrun Nahar
(74) *Attorney, Agent, or Firm* — Nixon Peabody LLP; Eduardo J. Quiñones

(57) ABSTRACT

A system, method and computer-readable storage devices for enabling improved management and installation of default configurations for firmware such as a basic input/output system (BIOS) or unified extensible firmware interface (UEFI) on a computer motherboard. The system disclosed herein includes an additional storage device connected to system south bridge, which can store additional groups of default firmware configuration settings. The additional storage device is accessible directly by both the firmware and the baseboard management controller (BMC), so that a remote entity can update the firmware through an out-of-band network connection without using a local operating system and without booting into a local firmware update utility. In one variation, the additional storage can still be separately accessible via a local operating system. In this way, the configuration procedure is more flexible and convenient for managing multiple computing devices, such as for managing a rack of servers in a data center.

12 Claims, 6 Drawing Sheets

SYSTEM AND METHOD FOR ADDING AND STORING GROUPS OF FIRMWARE DEFAULT SETTINGS

BACKGROUND

1. Technical Field

The present disclosure relates to firmware access and management, and more specifically to dynamically adding and storing several groups of default firmware settings.

2. Introduction

Computer motherboards almost invariably include firmware and a corresponding firmware interface, such as a basic input/output system (BIOS) or unified extensible firmware interface (UEFI). Users can configure the firmware after purchase beyond the default settings. Firmware can also be customized for various configurations or purposes. For example, a rack server may be sold to different customers, and different customers may have their favorite configuration settings. A vendor can preload different configurations stored in firmware in advance for different customers. However, the vendor is only able to preconfigure one default setting for one customer in each firmware.

If that default setting is not what the customer desires, the customer must go through multiple steps on multiple machines to reconfigure the firmware. For example, the customer must search for or create a configuration update file for use with the firmware manipulation or flashing utility. Then the specific procedures for that motherboard and/or firmware should be followed to install the configuration update file, such as a firmware update to flash the BIOS. This can present difficulties in cost and time to deploy, as well as a risk that the process does not complete properly and renders the firmware unusable, colloquially known as 'bricking' the device. These risks are compounded when a customer desires to update or configure new default firmware settings on multiple devices.

DETAILED DESCRIPTION

A system, method and computer-readable storage devices are disclosed for enabling improved management and installation of default configurations or settings for firmware. Throughout this application, the terms firmware and BIOS are used interchangeably to refer to the combination of a hardware device and computer instructions that reside on that hardware device, such as a basic input/output system (BIOS) or unified extensible firmware interface (UEFI) on a computer motherboard. The system disclosed herein includes an additional storage device connected to system south bridge, which can store additional groups of default firmware configuration settings. The additional storage device is accessible directly by both the firmware and the baseboard management controller (BMC), so that a remote entity can update the firmware through an out-of-band network connection without using a local operating system and without booting into a local firmware update utility. In one variation, the additional storage can still be separately accessible via a local operating system. In this way, the configuration procedure is more flexible and convenient for managing multiple computing devices, such as for managing a rack of servers in a data center.

Figure 1:
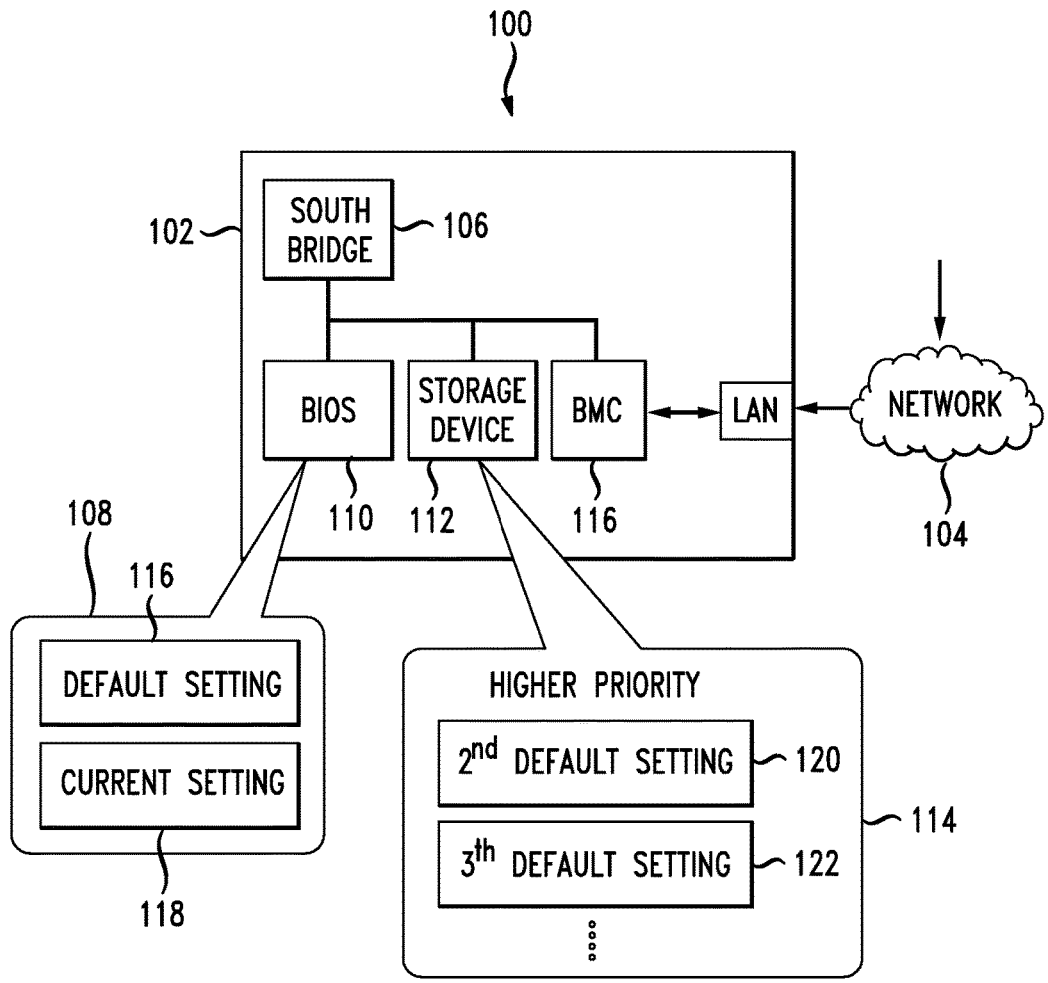
FIG. 1 illustrates an example storage device for storing multiple BIOS default settings.

FIG. 1 illustrates an example device 100 with a motherboard 102 having an additional storage device 112 for storing collections 114 of multiple additional default settings 120, 122 for a BIOS 110 in conjunction with a primary default setting 116. The additional storage device 112 can be a removable storage device such as a memory card or a USB flash drive or a fixed storage device such as a memory chip incorporated into the motherboard 102. While a single additional storage device 112 is depicted, the southbridge 106 can support multiple additional storage devices. A connecting bus is shown connecting the various components 106, 110, 112, 116. An exemplary connecting bus is an I²C bus that uses the I²C protocol, known to those of skill in the art as a multi-master, multi-slave, single ended, serial computer bus. Other connecting buses currently existing or developed in the future could also be used as well as would be known in the art. The motherboard 102 includes a south bridge 106 that connects the BIOS 110, the additional storage device 112, and the BMC 116. BMC 116 includes an interface to a network 104, such as via an Ethernet port or a wireless network adapter. The BIOS 110 includes a collection 108 of settings including the default setting 116 of the BIOS 110 and can also include current settings 118, if different from the default settings 116.

In one embodiment, the BIOS 110 is manufactured with only one default setting 116. The user or manufacturer can modify that default setting 116 or add other default settings. As described above, one way is to use a BIOS update or management utility that runs in an operating system on the device 100, and another way is to boot into a BIOS update or management utility, such as with a floppy disk, boot CD, or bootable flash drive. Flashing the entire BIOS 110 in this way with incorrect parameters may damage the device 100.

Using the principles set forth herein, an operating system environment and/or a local BIOS update or management utility is not necessary. One or more additional default settings can be provided to the BIOS 110 via the additional storage device 112. Besides the original default setting 116, a user can create other default settings 120, 122 in runtime without ROM utility manipulation and without updating the BIOS 110 itself. In one embodiment, the default settings 120, 122 in the additional storage device 112 can take higher priority over default settings 116 in the BIOS 110. Alternatively, a remote user can access an interface, via the network 104 and BMC 116, to store, load, delete, prioritize, copy, modify, and/or otherwise manage desired default settings 120, 122 in the additional storage device 112 without the use of a local operating system, a local BIOS update utility, or entering the local BIOS user interface.

BMC 116 can receive instructions from the network 104 and update the storage device 112 directly, without involving the BIOS 110. In this case, the BIOS 110 can include logic or functionality to detect changes in the storage device 112, such as during POST, and determine how or whether to handle those changes at that time. In one embodiment, the BIOS 110 automatically handles any changes in the storage device 112, potentially representing new default settings. The BIOS 110 can alternatively prompt a user to manually select which defaults to use, or provide some indication that other defaults are available for a user to select and allow the user to select different defaults for a limited duration before continuing with the existing BIOS configuration.

Figure 2:
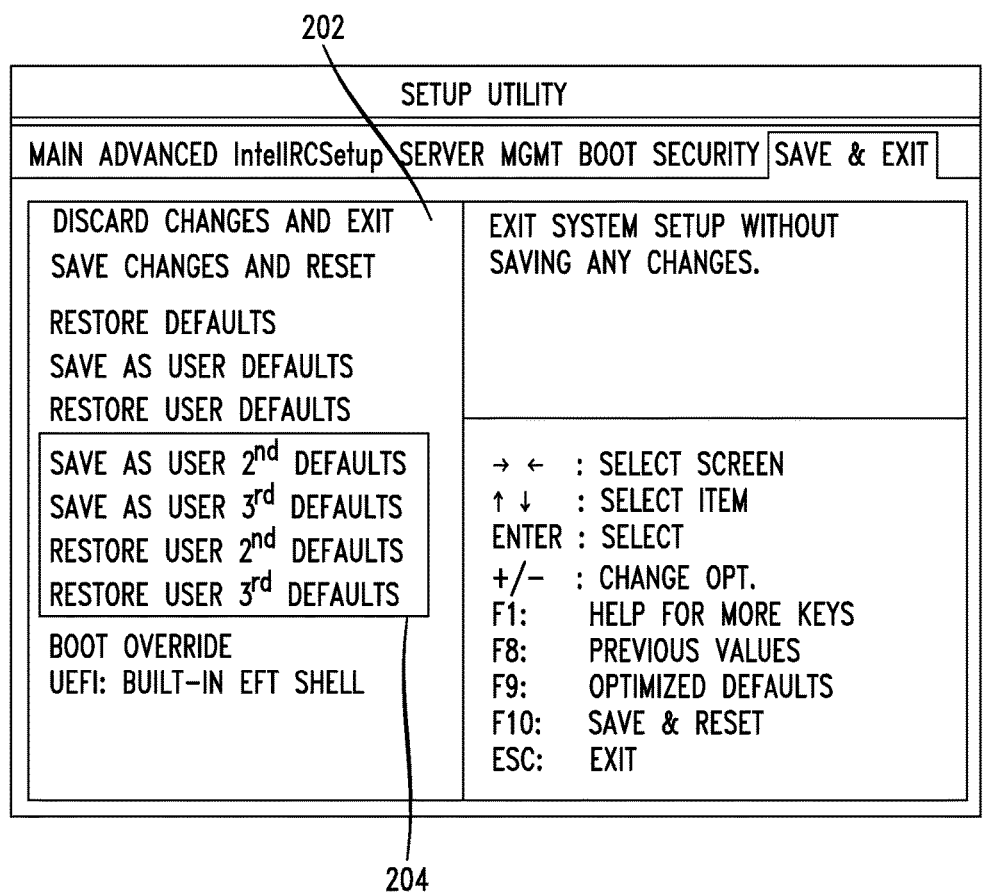
FIG. 2 illustrates an example BIOS setup interface with additional options for default settings in storage device.

However, the additional default settings 120, 122 can still be managed separately via the local BIOS user interface. FIG. 2 illustrates a screenshot 200 of an example BIOS user interface 202 with additional options 204 for managing default settings in the additional storage device. This user interface 202 shows ways to save a current configuration of the BIOS as various additional default settings. This user interface 202 can indicate whether the various default settings are stored in the additional storage device 112 or in the BIOS 110 itself. This example screenshot 200 does not indicate where the default settings are stored.

Figure 3:
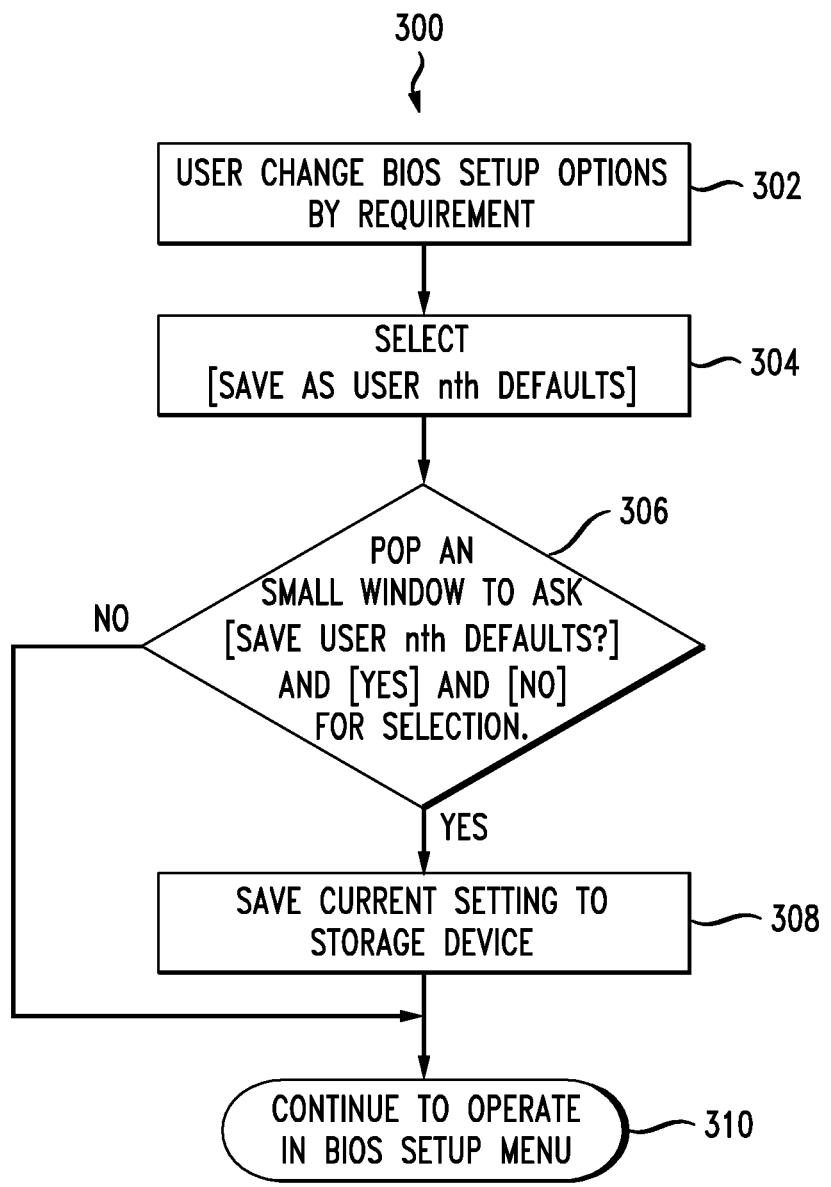
FIG. 3 illustrates an example flowchart for saving current setting into a storage device.

For example, the user may want to change some setting of the CPU, such as enabling or disabling whether the CPU recognizes the Execute Disable Bit or whether virtualization instructions are enabled for the CPU. The user can boot into the BIOS, modify the desired settings, then select "Save as User nth Defaults." The BIOS user interface can present a confirmation window or prompt. If the user selects "Yes," then the current setting will be saved into the additional storage device as the nth default setting. If the user selects "No," and the system does nothing with the additional storage and returns to the previous screen. FIG. 3 summarizes this process 300. The user first makes the desired changes in the BIOS 302. The user navigates to the option "Save as User nth Defaults" 304. The BIOS user interface presents a confirmation prompt 306. If the user confirms, then the system saves the current settings to the additional storage device 308, and returns to the BIOS user interface 310. If the user does not confirm, the system does not save the current settings and returns to the BIOS user interface 310.

Figure 4:
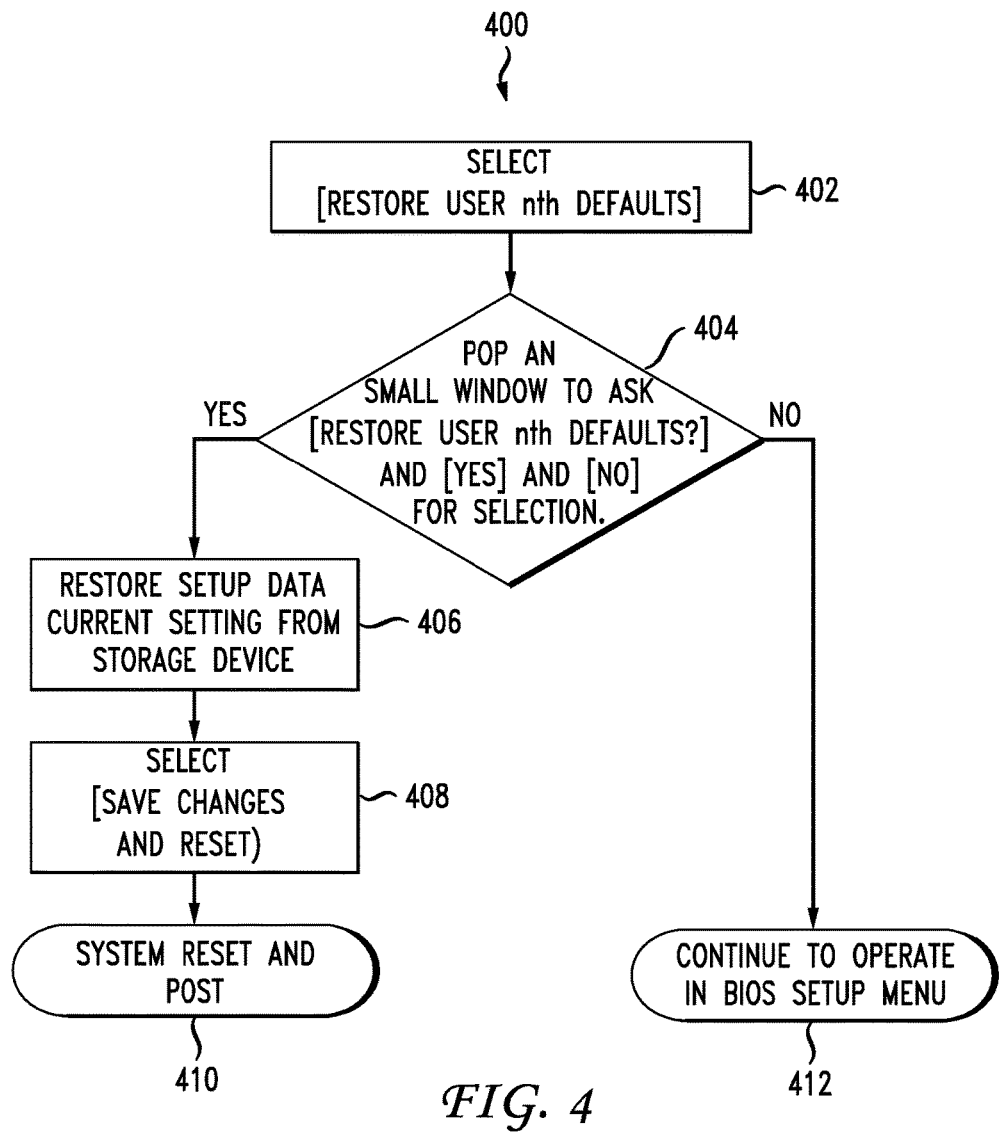
FIG. 4 illustrates an example flowchart for restoring BIOS default settings from a storage device.

To restore BIOS default setting from the additional storage device, the user can select "Restore User nth Defaults." The BIOS user interface can present a confirmation window or prompt. If the user selects "Yes," then the system will overwrite the current settings with the indicated nth default settings from the additional storage device. FIG. 4 summarizes this process 400. The user selects the option "Restore User nth Defaults" 402, and the BIOS user interface presents a confirmation prompt 404. If the user confirms, then the system retrieves the indicated default settings and configured the BIOS according to those default settings 406. Then the user can save the changes 408 and the system can reboot 410 using the new settings. Alternatively, if the user does not confirm, the system returns to the BIOS user interface 412.

Figure 5:
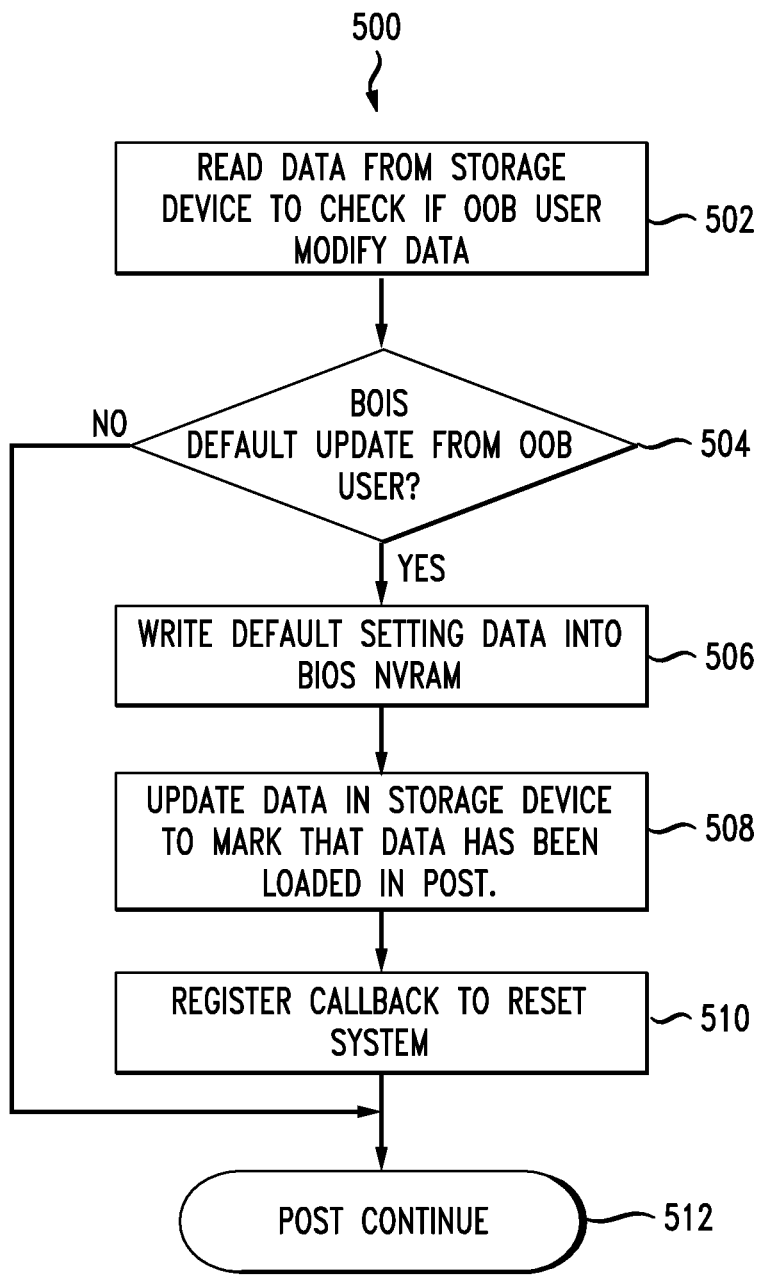
FIG. 5 illustrates an example flowchart of BIOS POST for loading default settings in a storage device by checking data in the storage device.

The bios default settings in the BIOS and in the additional storage device can be accessed, modified, and/or managed via an out-of-band network connection through the BMC. In this approach, the BIOS does not provide a visual interface for the user to load default setting in the additional storage device. FIG. 5 illustrates an example flowchart 500 of a BIOS power-on self-test (POST) for loading default settings from the additional storage device. If the system determines that the BIOS default settings in additional storage device were modified by BMC from an OOB network connection, the BIOS reads data from the additional storage device during the POST to check if the additional storage device has been modified 502. If the data in the additional storage device was updated, the BIOS can optionally check the priority for the default settings in the additional storage device 504. If the priority indicates that the default settings in the additional storage device are higher than the current default settings, then the BIOS can load the new default setting from the additional storage device to overwrite the current default settings 506, and update data in storage device to mark that data has been loaded in POST 508. The system would then not reload the default settings from the additional storage device again at the next POST, unless it was modified, such as by an OOB network request. Then the BIOS can register a callback to reset the system 510 and proceed to POST with the new default settings 512. If, on the other hand, the priority of the default settings in the additional storage device indicate that they are lower priority than the existing default settings, the BIOS simply proceeds to POST 512.

In the case of a removable storage device, the system can simply determine whether a state of the removable storage device has changed, indicating that the removable storage device has been removed or inserted, for example.

The steps outlined herein with respect to FIGS. 3-5 are examples and can be implemented in any combination thereof, including combinations that exclude, add, or modify certain steps. Various embodiments of the disclosure are described in detail herein. While specific implementations are described, it should be understood that this is done for illustration purposes only. Other components and configurations may be used without parting from the spirit and scope of the disclosure.

The default configurations stored in the additional storage device can include a configuration file, an image file for flashing a firmware ROM, PROM, or EPROM, or Entire BIOS, and/or other data indicating one or more individual settings of the firmware. In this way, the system can overwrite the entire contents of the firmware, or can overwrite a portion of the firmware.

Figure 6:
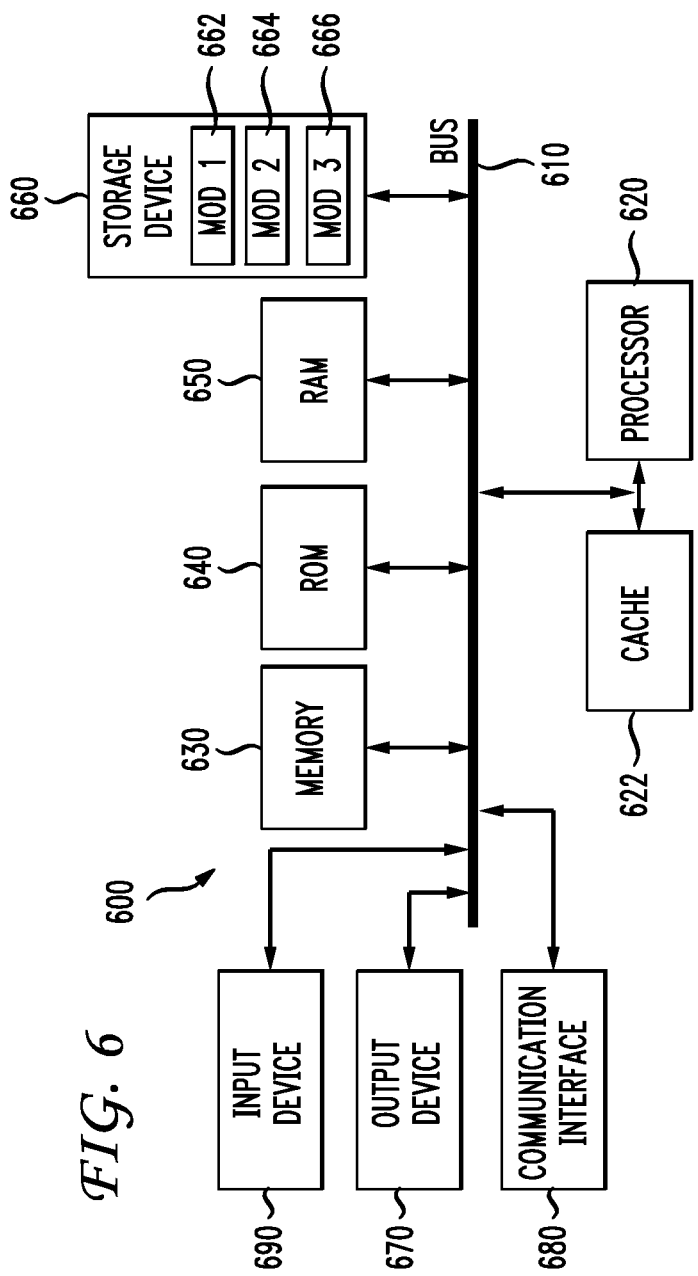
FIG. 6 illustrates an example system embodiment.

A brief description of a basic general purpose system or computing device in FIG. 6 which can be employed to practice the concepts, methods, and techniques disclosed is illustrated. These variations shall be described herein as the various embodiments are set forth. The disclosure now turns to FIG. 6.

With reference to FIG. 6, an exemplary system and/or computing device 600 includes a processing unit (CPU or processor) 620 and a system bus 610 (using a protocol such as the i2C protocol, for example) that couples various system components including the system memory 630 such as read only memory (ROM) 640 and random access memory (RAM) 650 to the processor 620. The system 600 can include a cache 622 of high-speed memory connected directly with, in close proximity to, or integrated as part of the processor 620. The system 600 copies data from the memory 630 and/or the storage device 660 to the cache 622 for quick access by the processor 620. In this way, the cache provides a performance boost that avoids processor 620 delays while waiting for data. These and other modules can control or be configured to control the processor 620 to perform various operations or actions. Other system memory 630 may be available for use as well. The memory 630 can include multiple different types of memory with different performance characteristics. It can be appreciated that the disclosure may operate on a computing device 600 with more than one processor 620 or on a group or cluster of computing devices networked together to provide greater processing capability. The processor 620 can include any general purpose processor and a hardware module or software module, such as module 1 662, module 2 664, and module 3 666 stored in storage device 660, configured to control the processor 620 as well as a special-purpose processor where software instructions are incorporated into the processor. The processor 620 may be a self-contained computing system, containing multiple cores or processors, a bus, memory controller, cache, etc. A multi-core processor may be symmetric or asymmetric. The processor 620 can include multiple processors, such as a system having multiple, physically separate processors in different sockets, or a system having multiple processor cores on a single physical chip. Similarly, the processor 620 can include multiple distributed processors located in multiple separate computing devices, but working together such as via a communications network. Multiple processors or processor cores can share resources such as memory 630 or the cache 622, or can operate using independent resources. The processor 620 can include one or more of a state machine, an application specific integrated circuit (ASIC), or a programmable gate array (PGA) including a field PGA.

The system bus 610 (or connecting bus) may be any of several types of bus structures including a memory bus or memory controller, a peripheral bus, and a local bus using any of a variety of bus architectures. A basic input/output (BIOS) stored in ROM 640 or the like, may provide the basic routine that helps to transfer information between elements within the computing device 600, such as during start-up. The computing device 600 further includes storage devices 660 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 660 can include software modules 662, 664, 666 for controlling the processor 620. The system 600 can include other hardware or software modules. The storage device 660 is connected to the system bus 610 by a drive interface. The drives and the associated computer-readable storage devices provide nonvolatile storage of computer-readable instructions, data structures, program modules and other data for the computing device 600. In one aspect, a hardware module that performs a particular function includes the software component stored in a tangible computer-readable storage device in connection with the necessary hardware components, such as the processor 620, bus 610, display 670, and so forth, to carry out a particular function. In another aspect, the system can use a processor and computer-readable storage device to store instructions which, when executed by the processor, cause the processor to perform operations, a method or other specific actions. The basic components and appropriate variations can be modified depending on the type of device, such as whether the device 600 is a small, handheld computing device, a desktop computer, or a computer server. When the processor 620 executes instructions to perform "operations", the processor 620 can perform the operations directly and/or facilitate, direct, or cooperate with another device or component to perform the operations.

Although the exemplary embodiment(s) described herein employs the hard disk 660, other types of computer-readable storage devices which can store data that are accessible by a computer, such as magnetic cassettes, flash memory cards, digital versatile disks (DVDs), cartridges, random access memories (RAMs) 650, read only memory (ROM) 640, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 600, an input device 690 represents any number of input mechanisms, such as a microphone for speech, a touch-sensitive screen for gesture or graphical input, keyboard, mouse, motion input, speech and so forth. An output device 670 can also be one or more of a number of output mechanisms known to those of skill in the art. In some instances, multimodal systems enable a user to provide multiple types of input to communicate with the computing device 600. The communications interface 680 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system embodiment is presented as including individual functional blocks including functional blocks labeled as a "processor" or processor 620. The functions these blocks represent may be provided through the use of either shared or dedicated hardware, including, but not limited to, hardware capable of executing software and hardware, such as a processor 620, that is purpose-built to operate as an equivalent to software executing on a general purpose processor. For example the functions of one or more processors presented in FIG. 6 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 640 for storing software performing the operations described below, and random access memory (RAM) 650 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 600 shown in FIG. 6 can practice all or part of the recited methods, can be a part of the recited systems, and/or can operate according to instructions in the recited tangible computer-readable storage devices. Such logical operations can be implemented as modules configured to control the processor 620 to perform particular functions according to the programming of the module. For example, FIG. 6 illustrates three modules Mod1 662, Mod2 664 and Mod3 666 which are modules configured to control the processor 620. These modules may be stored on the storage device 660 and loaded into RAM 650 or memory 630 at runtime or may be stored in other computer-readable memory locations.

One or more parts of the example computing device 600, up to and including the entire computing device 600, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations.

Ultimately however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 620 can include all types of processors disclosed herein, including a virtual processor. However, when referring to a virtual processor, the processor 620 includes the software components associated with executing the virtual processor in a virtualization layer and underlying hardware necessary to execute the virtualization layer. The system 600 can include a physical or virtual processor 620 that receive instructions stored in a computer-readable storage device, which cause the processor 620 to perform certain operations. When referring to a virtual processor 620, the system also includes the underlying physical hardware executing the virtual processor 620.

Embodiments within the scope of the present disclosure may also include tangible and/or non-transitory computer-readable storage devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hard-wired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply generally to any device with a configurable firmware with default configurations or settings that can be updated or changed. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

I claim:

1. A motherboard comprising:
a connecting bus that connects a firmware, a storage device, and a baseboard management controller,
wherein the firmware configured with a first default configuration,
wherein the baseboard management controller further comprises a network interface,
wherein the firmware stores a first set of default settings,
wherein the storage device stores a second set of default setting, the second set of default settings having a higher priority over the first set of default settings,
wherein the store device is accessible via at least one of the firmware and the baseboard management controller through an out-of-band network connection without using a local operating system such that at least one of the second set of default settings stored in the storage device is modified, and
wherein the storage device is external to the firmware.

2. The motherboard of claim 1, wherein the firmware is configured to detect a change in the storage device representing the at least one of the second set of default settings and overwrite the first default configuration with the at least one of the second set of default settings.

3. The motherboard of claim 1, wherein the connecting bus is an I2C bus.

4. The motherboard of claim 1, wherein the storage device comprises at least one of a removable storage device or an integrated storage device on the motherboard.

5. The motherboard of claim 1, wherein the storage device is accessible via the baseboard management controller to modify the at least one of the second set of default settings stored in the storage device without entering a firmware configuration user interface and without involving an operating system.

6. The motherboard of claim 1, wherein the storage device is accessible via the firmware to modify the at least one of the second set of default settings stored in the storage device as the firmware is executing.

7. The motherboard of claim 1, wherein the firmware comprises at least one of UEFI or BIOS.

8. A method comprising:
receiving, via a network interface connected to a firmware of a computing device through an out-of-band network connection and without involvement of an operating system of the computing device, a request to modify at least one of a second set of default settings stored in a storage device external to the firmware, wherein the firmware stores a first set of default settings, wherein the second set of default settings has a higher priority over the first set of default settings;
modifying the at least one of the second set of default settings according to the request;
setting a flag indicating that the at least one of the second set of default settings has been modified; and at a next boot, upon detecting that the flag has been set, reading the at least one of the second set of default settings from the storage device and overwriting the firmware with the at least one of the second set of default settings.

9. The method of claim 8, further comprising detecting a change in the storage device representing the at least one of the second set of default settings and overwriting the first default configuration with the at least one of the second set of default settings.

10. The method of claim 8, wherein the storage device comprises at least one of a removable storage device or an integrated storage device on a motherboard of the computing device.

11. The method of claim 8, wherein the storage device is accessible via a baseboard management controller of the computing device, and wherein the method further comprises accessing the storage device via the baseboard management controller and modifying the at least one of the second set of default settings stored in the storage device without entering a firmware configuration user interface and without involving an operating system.

12. The motherboard of claim 1, wherein the storage device is accessible via the firmware, and wherein the method further comprises accessing the storage device via the firmware and modifying the at least one of the second set of default settings stored in the storage device as the firmware is executing.

\* \* \* \* \*